United States Patent [19]

Sentle, Jr. et al.

[11] 4,221,427
[45] Sep. 9, 1980

[54] CONVERTIBLE TRAILER BODY CONSTRUCTION

[75] Inventors: Jesse W. Sentle, Jr., Pittsburgh, Pa.; Gerald J. Kish, Erie, Mich.

[73] Assignee: Sentle Trucking Company, Perrysburg, Ohio

[21] Appl. No.: 888,854

[22] Filed: Mar. 22, 1978

[51] Int. Cl.² .................................. B62D 27/00
[52] U.S. Cl. ................................. 296/181; 105/243
[58] Field of Search ............... 296/10, 15, 28 M, 18.3; 298/24, 25, 26, 27-37; 105/243, 363, 247-250

[56] References Cited

U.S. PATENT DOCUMENTS

| 537,348 | 4/1895 | Morse | 105/243 |
|---|---|---|---|
| 1,384,500 | 7/1921 | Westgate | 105/243 |
| 1,935,057 | 11/1933 | Natali | 105/243 |
| 2,049,617 | 8/1936 | Pflager | 105/243 |
| 2,071,620 | 2/1937 | Fitch | 105/243 |
| 2,534,501 | 12/1950 | Coleman | 296/28 M |
| 3,037,807 | 6/1962 | Hicks | 296/10 |
| 3,087,759 | 4/1963 | Worsten | 298/24 |
| 3,595,175 | 7/1971 | Austill | 105/243 |
| 3,648,859 | 3/1972 | Johnson | 298/24 |
| 3,901,552 | 12/1973 | Stone | 298/24 |
| 4,018,480 | 4/1977 | Stone | 298/27 |

Primary Examiner—John J. Love
Assistant Examiner—John A. Carroll
Attorney, Agent, or Firm—Wilson, Fraser, Barker & Clemens

[57] ABSTRACT

An improved dual purpose trailer body for a wheeled vehicle convertible to one position for handling freight of a bulk nature such as coils of steel or paper, panels of drywall construction material, and the like, and to another position for handling comminuted material such as dolomite, grain, and the like. The trailer body having normally horizontally disposed load supporting floor sections which are movably associated with the trailer body and positionable to a generally vertically disposed attitude to produce a bin wall structure forming a zone communicating with a hopper therebelow for receiving and maintaining comminuted material.

5 Claims, 10 Drawing Figures

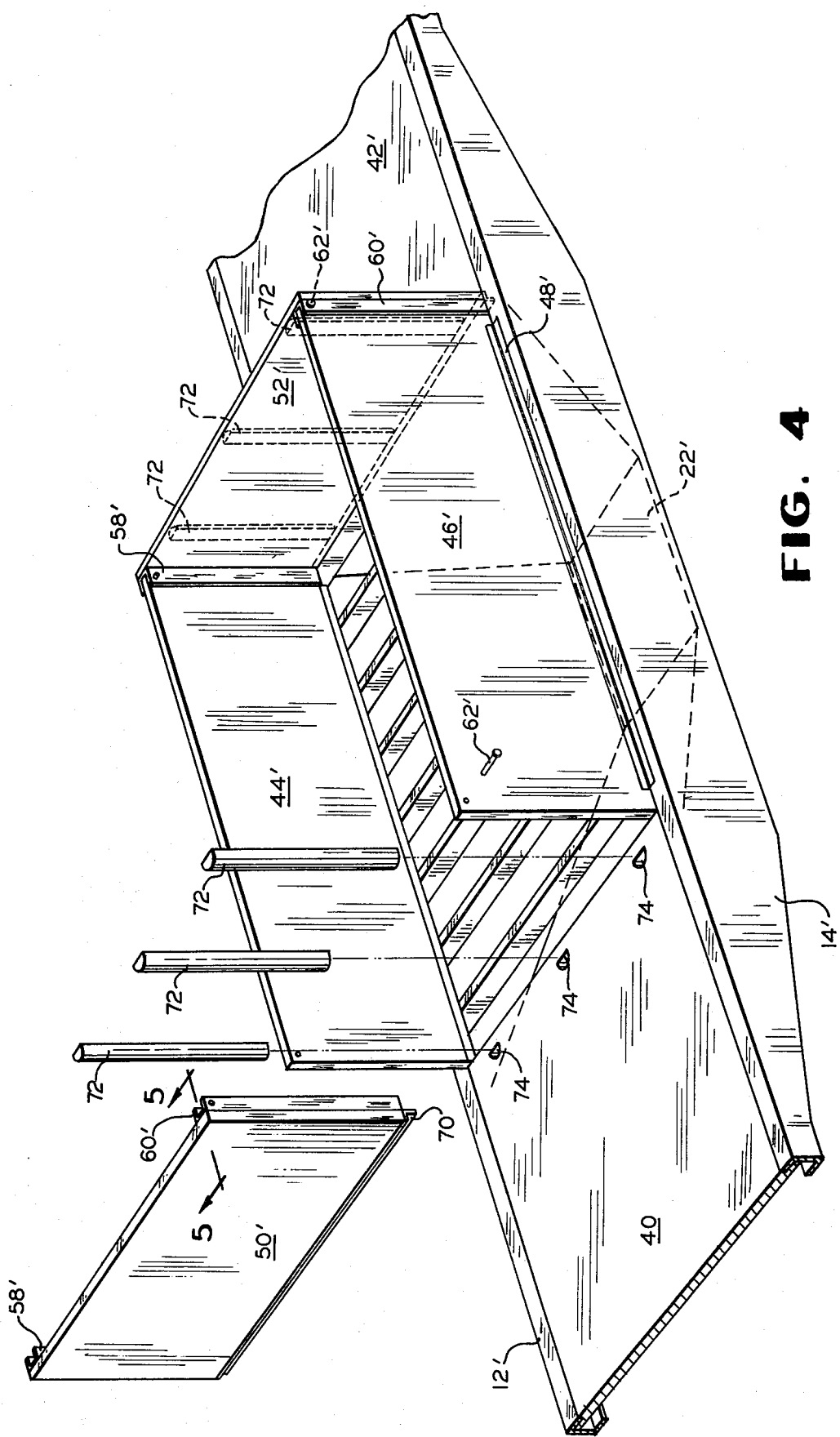

CONVERTIBLE TRAILER BODY CONSTRUCTION

BACKGROUND OF THE INVENTION

1. Field of the Invention

This invention relates to an improved trailer apparatus for transporting floor supported load or cargo and convertible to a trailer apparatus for transporting comminuted or granular material.

2. Description of the Prior Art

In recent years, there has become an increased demand for convertible or multi-purpose trailer body constructions which are capable of handling a variety of cargos such that the trailer body substantially continuously contains a payload and is not required to travel extended miles in a dead-head or non-load transporting condition. Since certain loads or cargos require flat bed type trailer bodies and other cargos require bin and hopper type trailer bodies, it has been found to be commercially feasible to produce a convertible type trailer body construction.

The U.S. Pat. No. 3,901,552 illustrates a convertible trailer apparatus convertible to one position for hauling floor supported cargo and to another position for hauling granular material wherein two of the normally horizontally disposed floor sections are pivoted upwardly about spaced apart longitudinally extending horizontal axes and two other floor sections are pivoted upwardly about two spaced apart transversely extending horizontal axes to form a bin communicating with hopper means therebelow for handling granular material.

Other similar structures relating to convertible trailer bodies are illustrated and described in U.S. Pat. Nos. 1,384,500 Westgate et al; 1,935,057 Natali; 2,049,617 Pflager; 2,071,620 Fitch; 3,037,807 Hicks; 3,087,759 Worsten; and 3,595,175 Austill.

It will be noted from a study of the structures of the prior art that none embodied the novel features and the resultant advantages of the present invention.

SUMMARY OF THE INVENTION

It is an object of the invention to produce a convertible trailer body construction convertible to one position for handling freight of a bulk nature and to another position for handling comminuted material.

It is another object of the invention to produce a convertible trailer body construction for selectively handling bulk loads and comminuted loads wherein at least the end walls of the bin construction for handling comminuted or granular material are readily and easily manually positioned for operative use.

Another object of the invention is to produce a convertible trailer body construction for selectively handling bulk freight and comminuted or granular freight wherein improved means are provided for establishing a sealing relation between the side and end wall sections of the construction when utilized for handling comminuted or granular material.

The above, as well as other objects, may be typically achieved by a convertible trailer body construction comprising a generally rectangular frame; a normally horizontal unobstructed floor carried by the frame; ground engaging wheel means; means for attaching the wheel means to the frame; hopper means adapted to depend beneath the frame; bin means positioned to extend above the level of the frame and adapted to form a granular material containing zone in selective communication with the hopper means; the bin means including at least two normally horizontally disposed extended surface rectangular floor sections having one of the marginal edge portions thereof pivotally connected to the frame to enable the respective floor sections to be pivoted upwardly from a horizontal to a vertical position to form two opposing spaced apart walls of the bin means, the bin means further including at least two extended surface rectangular end sections movable into vertical contact with the floor sections wherein the vertical marginal edges of the end sections are selectively sealingly interconnected with marginal edges of respective ones of the extended surface floor sections, the pivotally mounted floor sections and the extended surface end sections defining a zone above and in communication with the hopper means.

BRIEF DESCRIPTION OF THE DRAWINGS

The above as well as other objects and advantages of the invention will become readily apparent to one skilled in the art from reading the following detailed description of several embodiments of the invention when considered in the light of the accompanying drawings in which:

FIG. 4 is a partially exploded fragmentary perspective view of another embodiment of the invention;

DETAILED DESCRIPTION OF THE PREFERRED EMBODIMENT OF THE INVENTION

Figure 1:
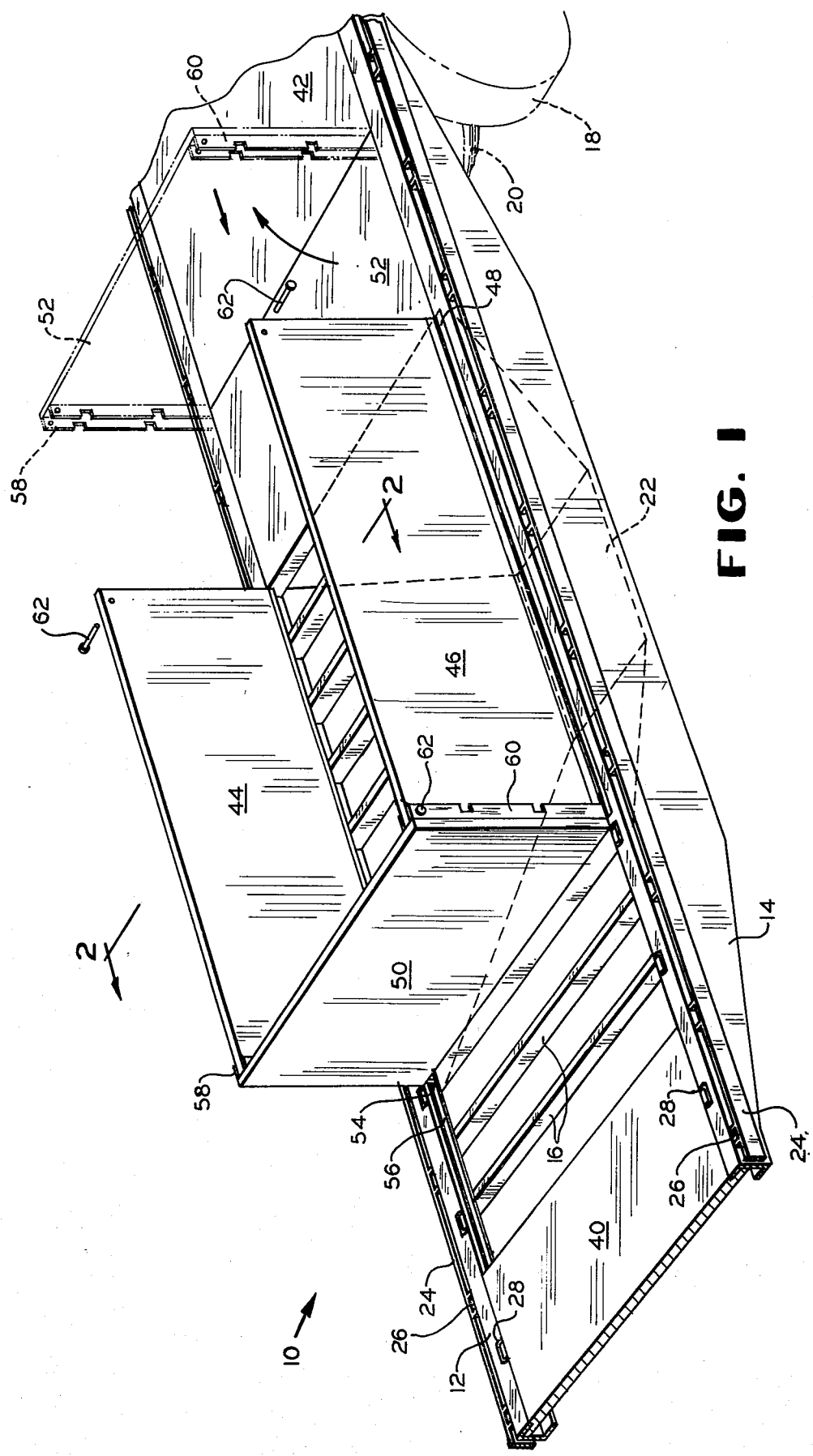
FIG. 1 is a fragmentary perspective view of one embodiment of the invention.
Figure 2:
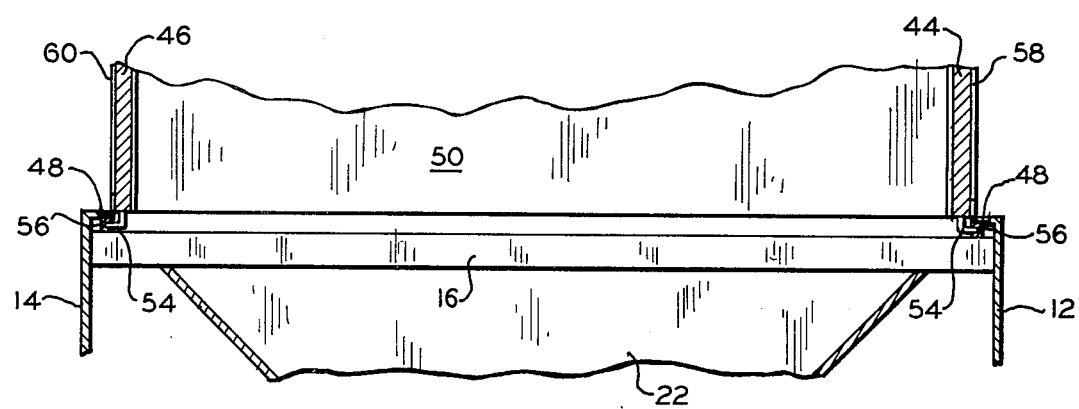
FIG. 2 is a fragmentary sectional view of the structure illustrated in FIG. 1 taken along line 2—2 thereof.
Figure 3:
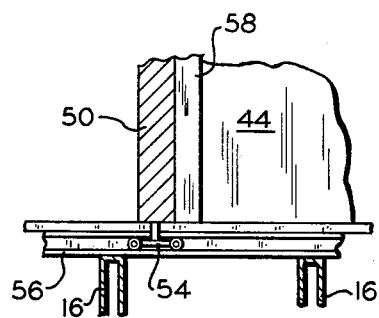
FIG. 3 is an enlarged fragmentary view partially in section illustrating the roller assembly of the embodiment illustrated in FIGS. 1 and 2.

Referring to the drawings and particularly to FIGS. 1, 2 and 3, there is illustrated a trailer construction generally indicated by reference numeral 10, incorporating the salient features of the present invention. The trailer 10 is capable of being selectively converted from a structure suitable for hauling floor supported loads or cargoes such as paper rolls, steel coils, drywall construction material and the like to a structure suitable for hauling granular or comminuted material such as grain, dolomite, and the like. The trailer 10 is connectable to a tractor (not shown) having a tiltable fifth wheel for moving the trailer from location to location in a conventional manner.

The trailer 10 includes a main generally rectangular frame 12 which may typically consist of a pair of spaced apart shaped metal longitudinally extending elongate side members 14 and a plurality of transversely extending beam members 16. Typically, the side members 14 and the transverse beam members 16 are formed of structural metal and are welded together at their joining portions to thus form an integral and strong frame 12 to support a number of fixed and movable floor sections to be explained in greater detail hereinafter.

The frame assembly 12, including the longitudinally extending elongate members 14 and the cross beams 16, is supported by suitable wheels 18 attached to the frame assembly through suitable shackels and springs 20 in the well known and conventional manner.

The trailer 10 also includes a hopper 22 which is attached to and depends beneath the frame assembly 12. Typically, the side walls which define the hopper 22 are inclined to converge toward the bottom discharge outlet which may be manually opened to discharge a load of granular or comminuted material and closed to contain such material during transport thereof.

A rub rail 24 is attached in slightly spaced relation to the outer sides of the elongate frame members 14 and is provided with a plurality of spaced apart sockets or pockets 26 to receive stakes (not shown) for the support of side walls for the trailer when it is used in the conventional freight hauling mode.

The frame member 12 may also be provided with a plurality of spaced tie down brackets 28 which consist of ring members that normally rest in recessed cavities and may be swung upwardly when being used to tie down a load on the trailer 10 when it is employed to transport such material as paper rolls, steel coils, and the like. In such a freight hauling mode all of the floor sections of the trailer are typically maintained in a horizontal position as will be described more fully hereinafter.

The trailer construction of the invention is adaptable to considerable convertibility to enable the same to assume a number of differing freight hauling modes. The most conventional freight hauling mode is one in which the floor of the trailer 10 is maintained in a horizontal unobstructed condition. In such mode there is a number of fixed fore and aft floor sections 40 and 42 which span the space between the spaced apart elongate frame members 14 and are attached thereto by any suitable means. The floor sections 40 and 42 may be formed of any suitable load bearing material but often it has been found that wooden planks have been very satisfactory. It will be observed that the floor sections 40 and 42 rest upon the cross beams 16 and the freight loads are thence transmitted to the side member 14. Accordingly, it will be appreciated that in practice the freight loads are transmitted to the entire frame structure which includes the side members 14, the cross beams 16 and the floor sections 40 and 42, as well as other floor sections to be mentioned.

Generally at an intermediate portion of the trailer 10, between the front and rear thereof and immediately above the hopper 22 and coterminous therewith, there is a portion of the trailer floor consisting of two similar floor sections 44 and 46. The outer marginal longitudinal edge portions of each of sections 44 and 46 are pivotally interconnected to the respective ones of the side members 14 by means of elongate hinges 48. In the horizontal disposition of the floor sections 44 and 46, the sections are caused to rest on the spaced apart cross beams 16 and provide, in effect, a covering surface for the upper portion of the hopper 22. The hinges 48 enable the floor sections 44 and 46 to be manually pivoted about the hinge axis to assume the vertical position such that they provide side wall sections of a bin structure for containing granular or comminuted material in cooperation with the hopper 22.

Immediately at the front and rear of the floor sections 44 and 46 are floor sections 50 and 52 adapted to reside in a horizontal position, in one mode, and be uniquely moved to a vertical position in another mode. In FIG. 1, the floor section 50 is illustrated after being moved to vertical position to form a front wall of the bin structure, while the rear section 52 is shown in a horizontal position in full line and in an intermediate vertical position in phantom lines after it has been pivoted upwardly to assume a vertical position before being moved forwardly to become the rear wall of the bin structure. In order to facilitate both the pivotal and the linear motion of the floor sections 50 and 52, the edges most remote from the center floor sections 44 and 46 are provided with pivotal roller means 54. The roller means 54 typically include a pair of spaced apart rollers interconnected by a carriage having a pivotal connection to the respective floor sections 50 and 52 as illustrated in FIG. 3. The rollers of the roller means 54 are adapted to roll in and be guided by a longitudinally extending track 56 which is secured to the inner portion of the frame member 14.

The marginal edge portions of the under surface of the floor sections 50 and 52 are provided with sealing channels 58 and 60 which are of a suitable size to receive the marginal edges of the floor sections 44 and 46. It will be noted that the sealing channels 58 and 60 are suitably notched to enable the reception of the cross beams 16 when the respective end sections 50 and 52 are in a horizontal position.

The manipulation of the floor sections 50 and 52 is achieved by initially grasping the inner edge portion most adjacent the floor sections 44 and 46 and moving the section upwardly and forwardly or rearwardly, as the case may be, until the section arrives at a vertical position. At this point, the entire assembly of the floor sections 50 or 52 and its associated roller means 54 is pushed toward the vertically positioned floor sections 44 and 46. This movement continues until the marginal edge portions of the floor sections 44 and 46 are suitably nested within the interior of the respective one of the sealing channels 58 and 60. At a point in the assembly operation, holes in the upper portion of the channels 58 and 60 align with holes in the upper portion of respective ones of the floor sections 44 and 46. The aligned holes then receive pins 62 which function to adequately retain a fixed relation between the floor sections 44 and 46 and the end sections 50 and 52 to form a bin structure for containing granular or comminuted material. It may be found to be desirable to employ more than one set of holes and retaining pins 62 to assure the desired retention.

When it is desired to return the floor sections to the horizontal position, the above described procedure is merely reversed.

Figure 5:
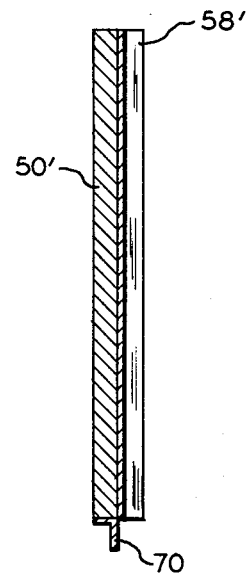
FIG. 5 is an enlarged sectional view of the structure illustrated in FIG. 4 taken along line 5—5 therof.

FIGS. 4 and 5 illustrate a modified version of the invention. In describing the modified form of the invention, like reference numerals with prime designations will be used to identify parts which are substantially identical with the part illustrated in the embodiment illustrated in FIGS. 1, 2 and 3. The trailer 10' of FIGS. 4 and 5 includes a main generally rectangular frame 12' which may typically consist of a pair of spaced apart shaped metal longitudinally extending elongate side members 14' and a plurality of transversely extending beam members 16'. Typically, the side members 14' and the transverse beam members 16' are formed of structured metal and are welded together at their joining portions in any conventional manner to form an integral and strong frame 12' to support a number of fixed and movable floor sections.

The frame assembly 12', including the longitudinally extending elongate members 14' and the interconnected cross beams 16', is supported by suitable ground engaging wheel, not shown.

The trailer 10' includes a hopper 22' which is attached to and depends beneath the frame assembly 12'. Rub rails may be attached to the sides of the frame 12' as in the previously described embodiment. Also, sockets or pockets for receiving stakes for supporting side walls are provided for the trailer when it is used in a conventional freight hauling mode. Tie down brackets may be situated in the side members 14' for use in tying down loads when required.

The trailer 10' includes at least two fixed floor sections 40' and 42', the former being forwardly situated and the latter being rearwardly disposed. At an intermediate location of the trailer 10', between the front section 40' and the rear section 42' and immediately above the hopper 22' and conterminous therewith, there is a portion of the trailer floor consisting of two similar floor sections 44' and 46'. The outer marginal edge portions of each of the sections 44' and 46' are pivotably interconnected to the respective ones of the side members 14' by means of elongate hinges 48' which enable the sections 44' and 46' to be manually pivoted about the hinge axis to assume a vertical position to provide side walls of a bin structure for containing granular or comminuted material in cooperation with the hopper 22'.

The end walls of the bin structure are found by the end wall panels 50' and 52' which are separate and independent of the trailer floor. Each of the panels 50' and 52' is provided with a depending flange 70 which is adapted to be received adjacent to the rearmost edge of the front floor section 40' and the frontmost edge of the rear floor section 42', respectively. The marginal edge portions of facing surfaces of the panels 50' and 52' are provided with sealing channels 58' and 60' to receive the marginal edges of the floor sections 44' and 46'. When the panels 50' and 52' are each disposed in the position in which 52' is shown in FIG. 4, holes in the channels 58' and 60' align with suitably located holes in the upper corners of the floor sections 44' and 46' so as to receive positioning or locking pins 62'.

To provide additional strength and stability to the panels 50' and 52' when in the position to define the end walls of a bin structure, there is provided a plurality of stakes 72, the lower ends of which are adapted to be received in spaced apart sockets formed in the respective floor sections 40' and 42'.

Figure 7:
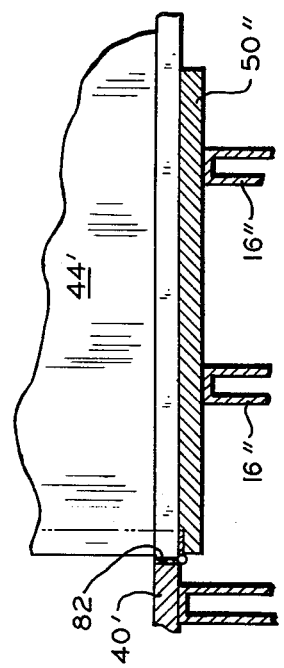
FIG. 7 is an enlarged sectional view of the structure illustrated in FIG. 6 taken along line 7—7 thereof.
Figure 6:
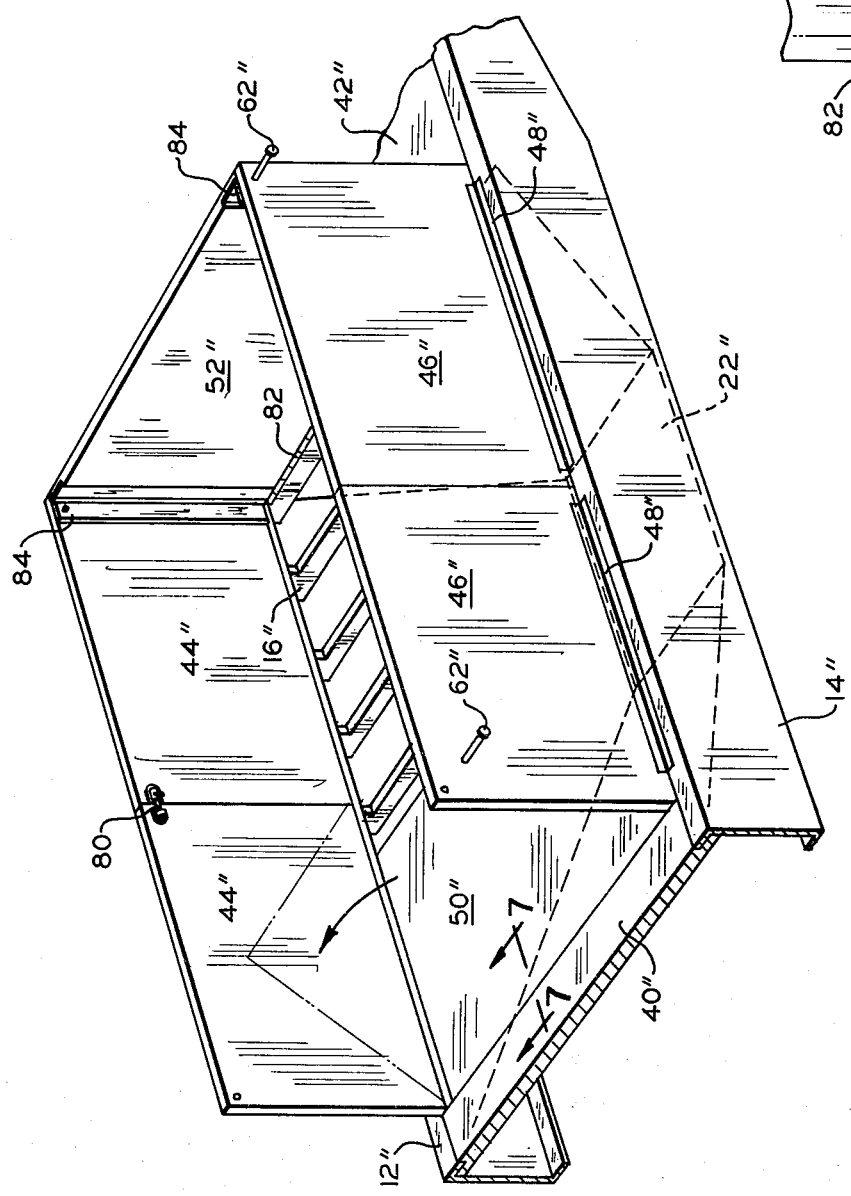
FIG. 6 is a fragmentary perspective view of still another embodiment of the invention.

Another modification of the trailer construction of the invention is illustrated in FIGS. 6 and 7 and is similar in many respects to the embodiments illustrated in FIGS. 1, 2, 3, 4 and 5. The construction illustrated in FIGS. 6 and 7 includes the same type of basic frame structure employing side frame members 14" having associated cross beams 16"; however, the floor sections over the hopper 22" are self contained in a compact fashion. The floor sections 44" and 46" are formed of two distinct and separately pivotal members to reduce the amount of weight requiring less energy to move from a horizontal position to a vertical position and may be locked together in the vertical position by a latching means 80.

The sections 50" and 52" which form the ends of the bin normally are caused to rest against the upper surfaces of the cross beams 16" and beneath the inner surface of the floor sections 44" and 46" when they are in a horizontal position as is apparent from FIG. 7. The sections 50" and 52" are pivotally connected to their respective adjacent floor sections by hinge means 82 which enable the sections to be moved from a horizontal position of section 50" to a vertical position of section 52". When both of the sections 50" and 52" are swung upwardly to a vertical position they cooperate with the floor sections 44" and 46" to form a bin structure for the hopper 22". In order to provide both a supporting interrelationship between the floor sections 44" and 46" and the sections 50" and 52" and to seal the adjoining corners thereof, there is provided pivotally movable hinge-like assemblies 84, typically connected to the outer marginal edges of the sections 50" and 52" and normally rest within recesses formed therein when in an inoperative position. When the sections 50" and 52" have been swung to a vertical position, one section of the hinge-like assemblies 84 is swung outwardly to the position illustrated in FIGS. 7 and 8. A hole in the upper portion of the hinge-like assembly 84 aligns with a hole in the upper portion of the floor sections 44" and 46" to receive a holding pin means 62".

Figure 8:
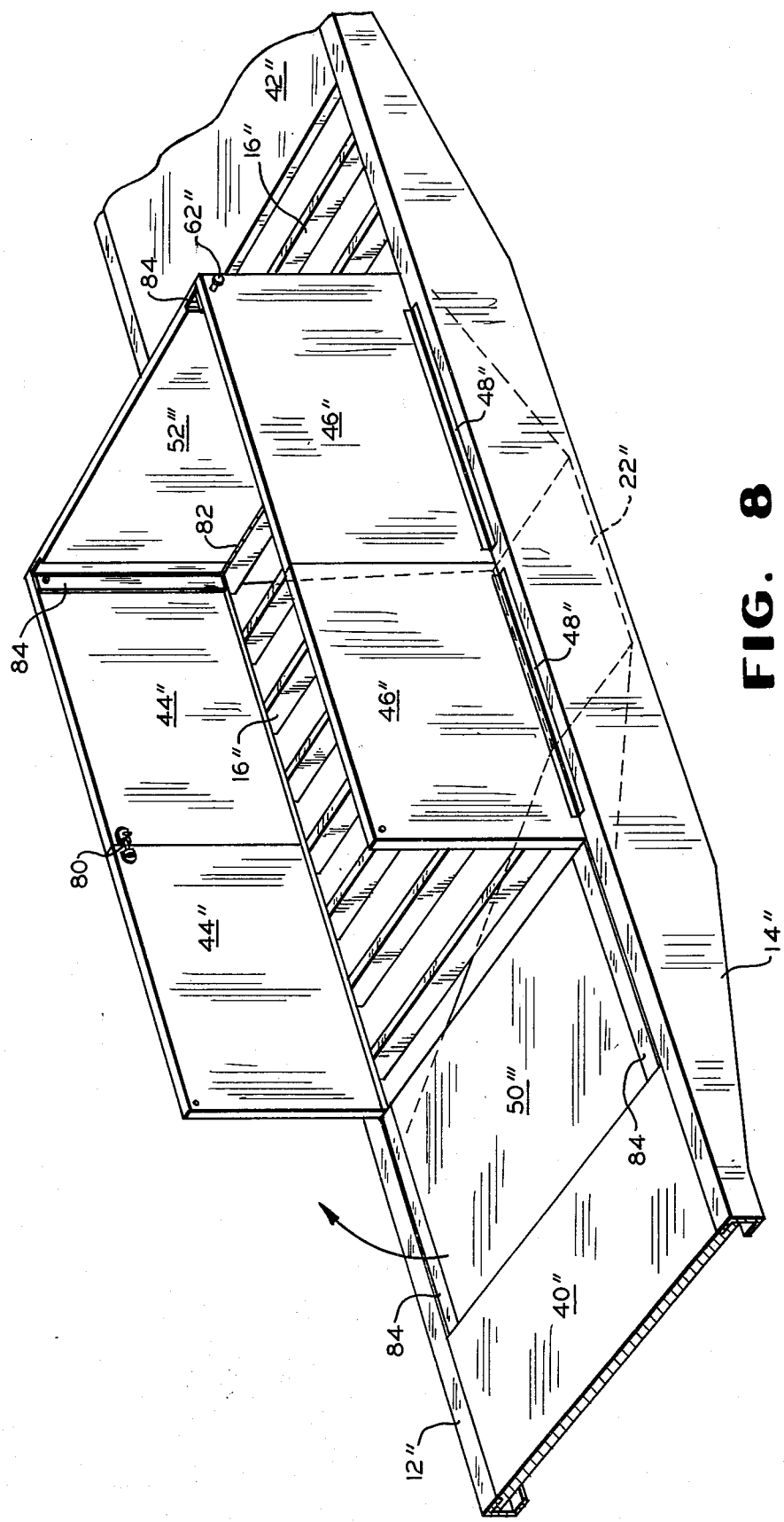
FIG. 8 is a fragmentary perspective view of another embodiment of the invention.

Referring to FIG. 8, there is shown a modified form of the trailer construction of the invention which is similar in all respects to the version illustrated in FIGS. 6 and 7 except that the floor sections 50'" amd 52'" which form the end walls of the bin structure are hingedly mounted to the cross beams members of the frame so as to swing upwardly from an operative horizontal load supporting position to a vertical position.

Figure 9:
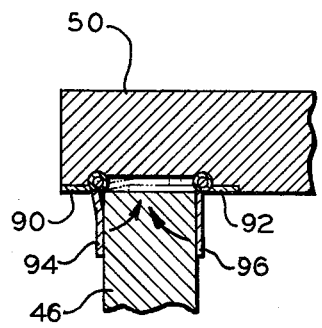
FIG. 9 is a fragmentary sectional view of a modified form of the sealing means employed in the structures illustrated in FIGS. 1 and 4.

FIG. 9 shows a modified form of the construction of the sealing channels 58 and 60 shown in FIGS. 1, 2 and 3. The sealing channel of FIG. 9 includes a pair of spaced apart metal strips 90 and 92 which may be affixed to either marginal edge portion of a recess formed in the section 50, for example. A pair of cooperating metal strips 94 and 96 are hingedly connected to the strips 90 and 92, respectively, and are spaced a sufficient amount to adequately receive the marginal edge of the side wall 46, for example. The cooperating metal strips 94 and 96 are provided with stop means which militate against the further opening thereof beyond the vertical position. When the sealing channels are not in use, the strips 94 and 96 fold inwardly and rest within the confines of the associated recess in the surface of the section 50 as shown in phantom lines in FIG. 9.

Figure 10:
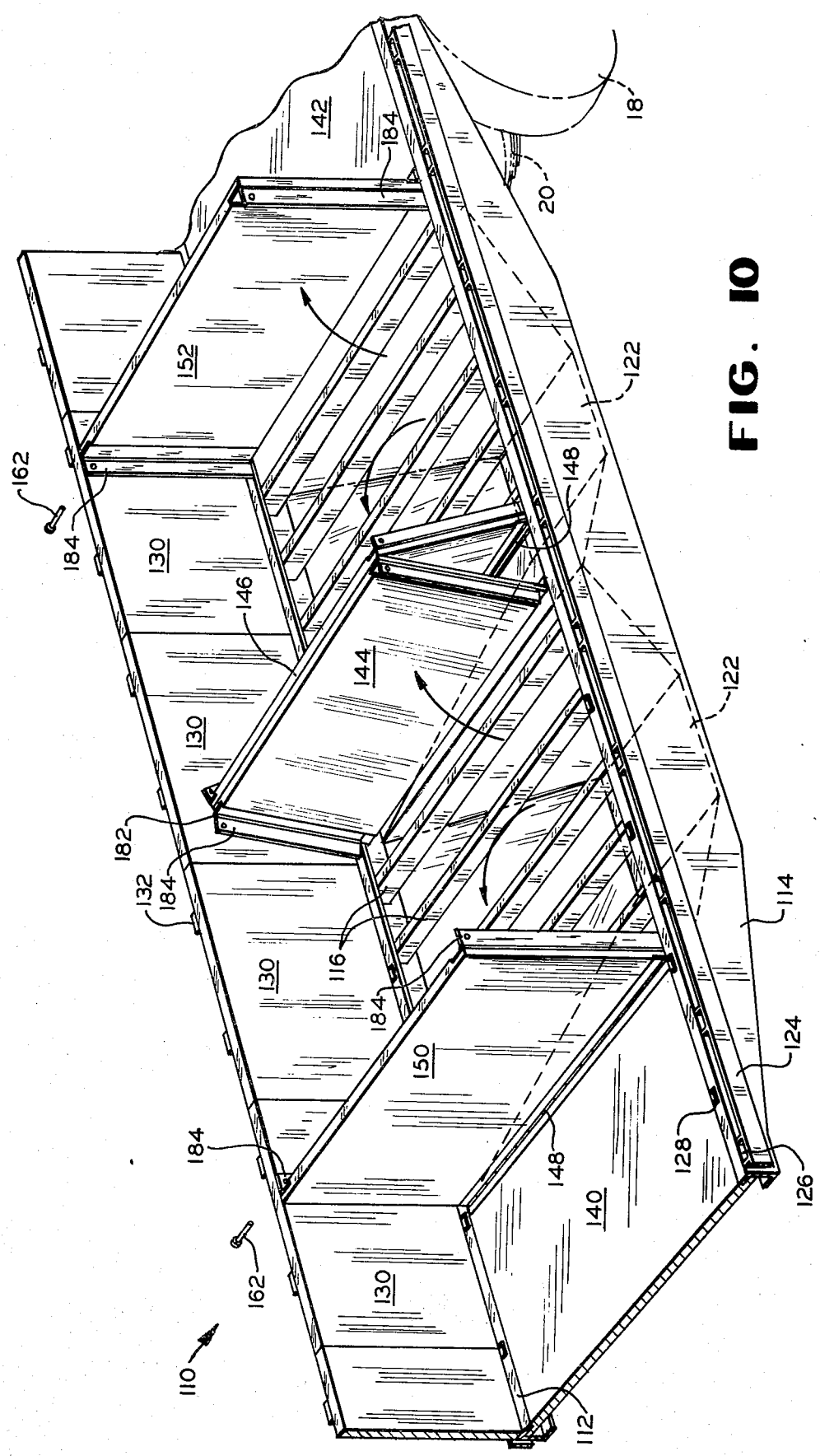
FIG. 10 is a fragmentary perspective view of a structure showing another utilization of the sealing means of the embodiments of the structure illustrated in FIGS. 6 and 8.

Referring to FIG. 10, there is illustrated trailer construction 110 incorporating the sealing features of the modifications of the invention which were illustrated in FIGS. 6, 7, and 8. The trailer 110 is capable of being selectively converted from a structure suitable for hauling four supported loads or cargos such as paper rolls, steel coils, drywall construction material and the like to a structure suitable for hauling granular or comminuted materials such as grain, dolomite, and the like.

The trailer 110 includes a main frame 112 which may typically consist of a pair of spaced apart shaped metal longitudinally extending elongate members 114 and a plurality of transversely extending beam members 116 which are formed of structural metal and are welded together at their joining portions. The trailer 110 also includes a pair of hopper assemblies 122 which are attached to and depend beneath the frame assembly 112. Typically, the side walls which define the hoppers 122 are inclined to converge toward the bottom discharge outlet which may be manually opened to discharge a load of granular or comminuted material and closed to contain such material during transport thereof.

A rub rail 124 is attached in slightly spaced relation to the outer sides of the elongate frame members 114 and are provided with a plurality of spaced apart sockets or pockets 126 to receive stakes 132 to support side walls 130 for the trailer when it is to be used in the conventional freight hauling mode.

The frame members, 112, may also be provided with a plurality of spaced tie-down brackets 128 which consist of ring members that normally rest in recessed cavities and may be swung upwardly when being used to tie down a load on the trailer 110 when it is employed to transport such material as paper rolls, steel coils, and the like. In such a freight hauling mode all the floor sections of the trailer are typically maintained in the horizontal position as will become apparent more fully hereinafter. When employed in the most conventional freight hauling mode in which the floor of the trailer 110 is maintained in the horizontal unobstructed position, there are a number of fixed fore and aft floor sections 140 and 142, respectively, which span the space between the spaced apart elongate frame members 114 and are attached thereto by suitable means. The intermediate portion of the trailer 110, between the front and rear thereof, and immediately above the hoppers 112 and coterminous therewith, there are a number of hingedly mounted floor sections 144, 146, 150, and 152. One transverse edge portion of each of the sections 144, 146, 150, and 152 is pivotally interconnected to the respective ones of the cross-members, for example, by means of elongate hinge members 148. In certain instances, the sections 150 and 152 have their transverse marginal edges connected to adjacent floor sections 140 and 142, respectively. In the horizontal disposition of the afore mentioned floor sections, sections are caused to rest on spaced apart cross-beams 116 and provide, in effect, a covering surface for the upper portion of the hoppers 122. The hinge members 148 enable the associated floor sections to be manually pivoted about the hinge axes to assume a generally vertical position as illustrated in FIG. 10 and provide end wall sections of a bin structure consisting of these wall sections and the associated side wall sections 130. It will be appreciated that the floor section 144 and 150 cooperate with spaced apart side sections 130 to provide a bin over one of the hoppers 122, while the floor section 146 and 152 cooperate with the associated side walls 130 to provide a bin structure over the other hopper 122.

It will be appreciated that in the illustrated embodiment of the invention in FIG. 10, in the position illustrated, the sealing means for supporting the floor sections 144, 146, 150, and 152 in the vertical position and provide a sealing relationship between the adjacent side panels 130 is formed of a pivotally moveable hinge-like assembly, 184. Typically, the hinge-like assemblies 184 are connected to the outer marginal edges of the four sections 144, 146, 150 and 152, and normally rest within recesses formed therein when in an inoperative position. When the associated four sections have been swung to a vertical position, one section of the hinge like assembly 184 is swung outwardly to the position illustrated in FIG. 10 and a hole therein is aligned with an associated hole in the upper portion of the associated side panels 130 to receive holding pin means 162.

It will be understood that while the description of the invention has referred to a frame structure wherein the frame structure is comprised of a pair of spaced apart contoured frame elongate frame members interconnected by transversely extending cross-beams, similar results can be achieved by a frame work which further includes a series of additional inwardly spaced and parallel longitudinally extending frame members. This type of structure would be utilized in instances where greater load capacities are required or for other manufacturing reasons.

In accordance with the provisions of the patent statutes, we have explained the principles and mode of operation of our invention, and have illustrated and described what we now consider to represent its best embodiments. However, we desire to have it understood that, within the scope of the appended claims, the invention may be practiced otherwise than as specifically illustrated and described.

We claim:

1. A convertible trailer body construction comprising:
   a generally rectangular frame,
   a normally horizontal unobstructed floor carried by said frame;
   ground engaging wheel means,
   means for attaching said wheel means to said frame;
   hopper means adapted to depend beneath said frame;
   bin means positioned to extend above the level of said frame and adapted to form a granular material containing zone in selective communication with said hopper means, said bin means including at least two normally horizontally disposed extended surface floor sections having one of the marginal edge portions thereof pivotally connected to said frame to enable the respective floor sections to be pivoted upwardly from a horizontal to a vertical position to form the opposing walls of said bin means, said bin means further including at least two extended surface end sections movable into vertical contact with said floor sections wherein the vertical marginal edges of said end sections are selectively sealingly interconnected with marginal edges of respective ones of the extended surface floor sections, said pivotally mounted floor sections and said extended surface end sections defining a zone above and in communication with said hopper means; and
   U-shaped sealing means for achieving a seal between the vertical marginal edges of said extended surface floor sections and respective marginal edges of said extended surface end sections.

2. A convertible trailer body construction as defined in claim 1 including guide means extending horizontally and longitudinally of said frame from the hinged connection of said extended surface floor sections and said frame, and roller means for guiding one of the transverse marginal edges of each of said extended surface end sections toward said extended surface floor sections, said guide means includes track means and a cooperating roller assembly.

3. A convertible trailer body construction as defined in claim 1 wherein said sealing means includes pairs of spaced apart elongate hinged members.

4. A convertible trailer body construction as defined in claim 3 wherein said pairs of hinged members are affixed to respective marginal edge portions of said extended surface end sections.

5. A convertible trailer body construction as defined in claim 4 wherein each of said pairs of hinged members are fitted in a recess in the respective marginal edge portions of said extended end sections.

* * * * *